United States Patent [19]

Tsuchida

[11] Patent Number: 4,958,369
[45] Date of Patent: Sep. 18, 1990

[54] KEY TELEPHONE SYSTEM ACCOMMODATING BOTH DIGITAL AND ANALOG TELEPHONE NETWORKS

[75] Inventor: Shinji Tsuchida, Zama, Japan

[73] Assignee: Canon Kabushiki Kaisha, Tokyo, Japan

[21] Appl. No.: 425,022

[22] Filed: Oct. 20, 1989

[30] Foreign Application Priority Data

Oct. 24, 1988 [JP] Japan ................................ 63-266148

[51] Int. Cl.⁵ .................... H04M 1/00; H04M 1/72
[52] U.S. Cl. .................................. 379/156; 379/157; 379/164
[58] Field of Search ................ 379/156, 157, 164, 165

[56] References Cited

U.S. PATENT DOCUMENTS 3,789,152 1/1974 Medill et al. ..................... 379/156

Primary Examiner—Stafford D. Schreyer
Attorney, Agent, or Firm—Fitzpatrick, Cella, Harper & Scinto

[57] ABSTRACT

In response to a calling-out command from an extension telephone set connected to an extension line from the main equipment of a key telephone system, an ISDN line and a PSTN line which are accommodated as external lines are searched for a free external line, until a free external line is acquired. A determination is made as to which type is the acquired external line, whether it is the ISDN line or the PSTN line. On the basis of the result of this determination, different kinds of audible sound are sent to the extension telephone set, thereby informing the type of the acquired external line.

7 Claims, 3 Drawing Sheets

KEY TELEPHONE SYSTEM ACCOMMODATING BOTH DIGITAL AND ANALOG TELEPHONE NETWORKS

BACKGROUND OF THE INVENTION

1. Field of the Invention

The present invention relates to a key telephone system and, more specifically, to such a system in which both a line in an integrated service digital network (hereinafter abbreviated to "ISDN line") and a public switched telephone network (hereinafter abbreviated to "PSTN line"), commonly used, are accommodated as external lines in the main equipment of the system, and in which extension telephone sets connected to at least two extension lines are each able to call out another terminal over an external line which may be either the ISDN line or the subscriber's telephone line.

2. Background Art

A key telephone system in which both an ISDN line and a PSTN line are accommodated as external lines has hitherto been such that, when the user operates an external line key of an extension telephone set and then calls out another terminal over an external line, the caller is not informed of whether the ISDN line or the PSTN line has been acquired by the operation of the main equipment of the system.

With the conventional system, therefore, a problem arises in which the caller cannot make a quick judgment as to whether the external line acquired is the ISDN line or the PSTN line. This is disadvantageous in that the caller cannot be sure whether various additional services provided in the ISDN are available, even when the ISDN line has actually been acquired by the operation of the main equipment. This means that the caller loses the opportunity of fully utilizing various functions available in the ISDN.

For instance, if the external line acquired is an ISDN line, the party who has received the call (i.e., the calling-in party) is informed of the number of the calling-out party and, accordingly, is aware who is calling before their conversation starts. However, the calling-out party, who cannot be aware of this fact, may start a conversation by introducing himself. Another drawback is that, although modemless data transmission is possible with an ISDN line, this function may not be utilized by a calling-out party.

Conversely, if a calling-out party who is actually using a PSTN line erroneously believes that he is using an ISDN line, he may encounter the following trouble. When the calling-out party starts a conversation with the calling-in party whom he considers, on the ground of his erroneous belief, to be already aware of who he is, the conversation becomes incoherent.

Another problem with the conventional system is that an ISDN line and a PSTN line employ different calling-out methods. In order to enable the same calling-out operation to be performed whether an ISDN line or a PSTN line is used by a calling-out party, complicated control is necessary while high cost is incurred.

SUMMARY OF THE INVENTION

The present invention has been accomplished to overcome the above-described problems.

An object of the present invention is to provide a key telephone system which is, when an extension telephone set Q is calling out another terminal over an external line, capable of posting the type of the external line acquired.

Another object of the present invention is to provide a key telephone system which allows the user to perform different calling-out operations in accordance with the type of the external line acquired.

These and other objects of the present invention will be apparent by referring to the following detailed specification and drawings.

DESCRIPTION OF THE PREFERRED EMBODIMENT

The preferred embodiment of the present invention will now be described in detail with reference to the accompanying drawings.

Figure 1:
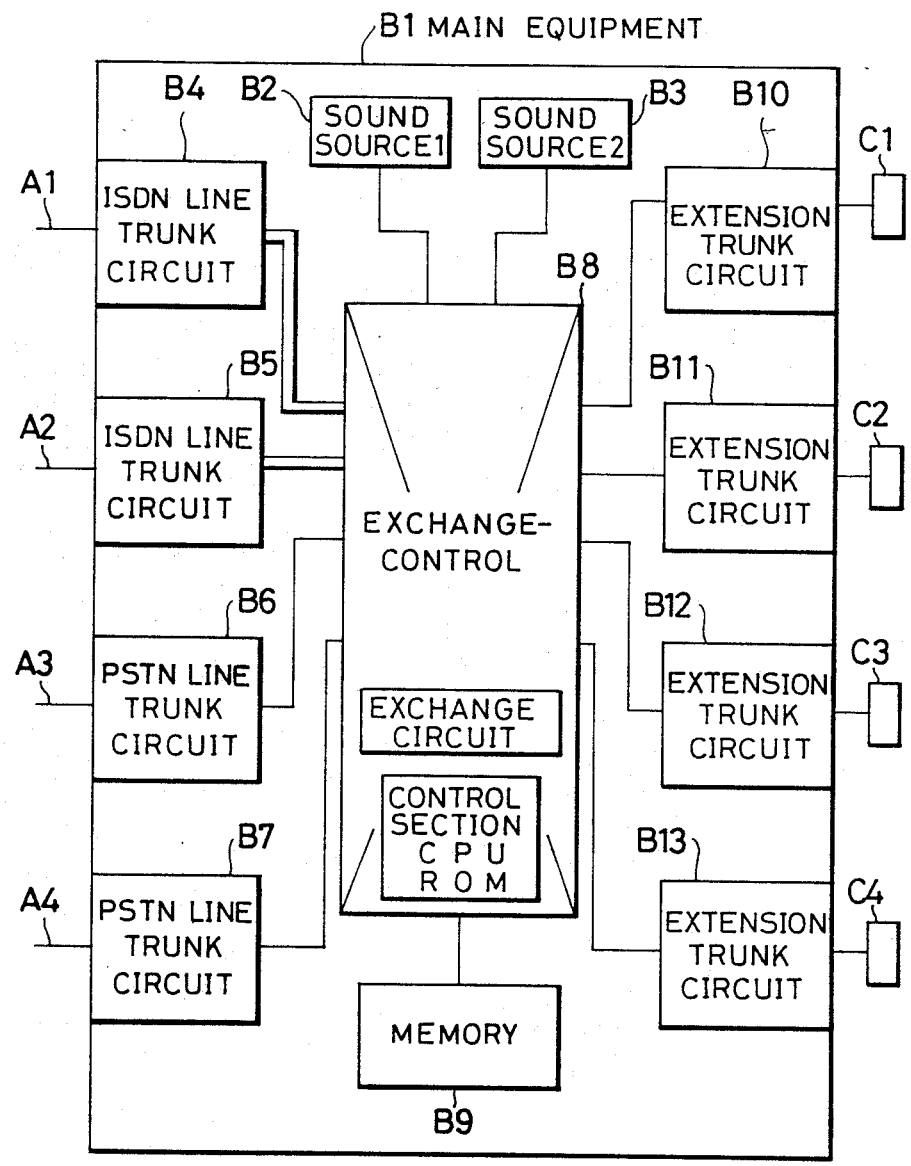
FIG. 1 is a view showing the construction of a key telephone system in accordance with an embodiment of the present invention.

Description of Construction (FIG. 1)

FIG. 1 shows the construction of a key telephone system in accordance with the embodiment. As shown in the figure, the key telephone system consists of a main equipment B1 accommodating ISDN lines A1 and A2 and PSTN lines A3 and A4 as external lines, and extension telephone sets C1 to C4 each connected to an extension line. The main equipment B1 comprises a first sound source B2 and a second sound source B3 for generating different dial tones; ISDN line trunk circuits B4 and B5 for controlling data communication in accordance with the ISDN communication protocol through the ISDN lines A1 and A2; PSTN line trunk circuits B6 and B7 operable, e.g., to transmit telephone numbers to the PSTN lines A3 and A4, and detect any incoming call received from the lines A3 and A4; extension trunk circuits B10 to B13 for receiving data from and sending data to the extension telephone sets C1 to C4, described later; an exchange-control B8 provided with an exchange circuit for performing the exchange of circuits within the trunk circuits B4 to B7 and within the trunk circuits B10 to B13, as well as the exchange of the sound sources B2 and B3, and with a control section for controlling the entire main equipment B1; and a memory B9 which is, when the exchange-control B8 performs an exchange operation, etc., used as various tables or work areas for administering various resources within the system and the state of a call or calls therein.

The above-described control section includes a CPU and a ROM storing the procedure that the CPU follows when it executes various steps, described later.

With the above-described construction, when a call-connecting command is received from, e.g., the ISDN line A1, the associated ISDN line trunk circuit B4 establishes the call in accordance with a call control procedure, and informs the control section of the exchange-control B8 of the reception of the call. Upon the reception of the call, the control section searches a call-state administering table within the memory B9, and commands that an extension trunk circuit to which a free extension telephone set is connected should send a "call incoming" tone. When the off hook state of the extension telephone set, brought forth by the user, has been detected, the exchange circuit of the exchange control B8 forms a speech path, whereby speech mode is entered.

Figure 2:
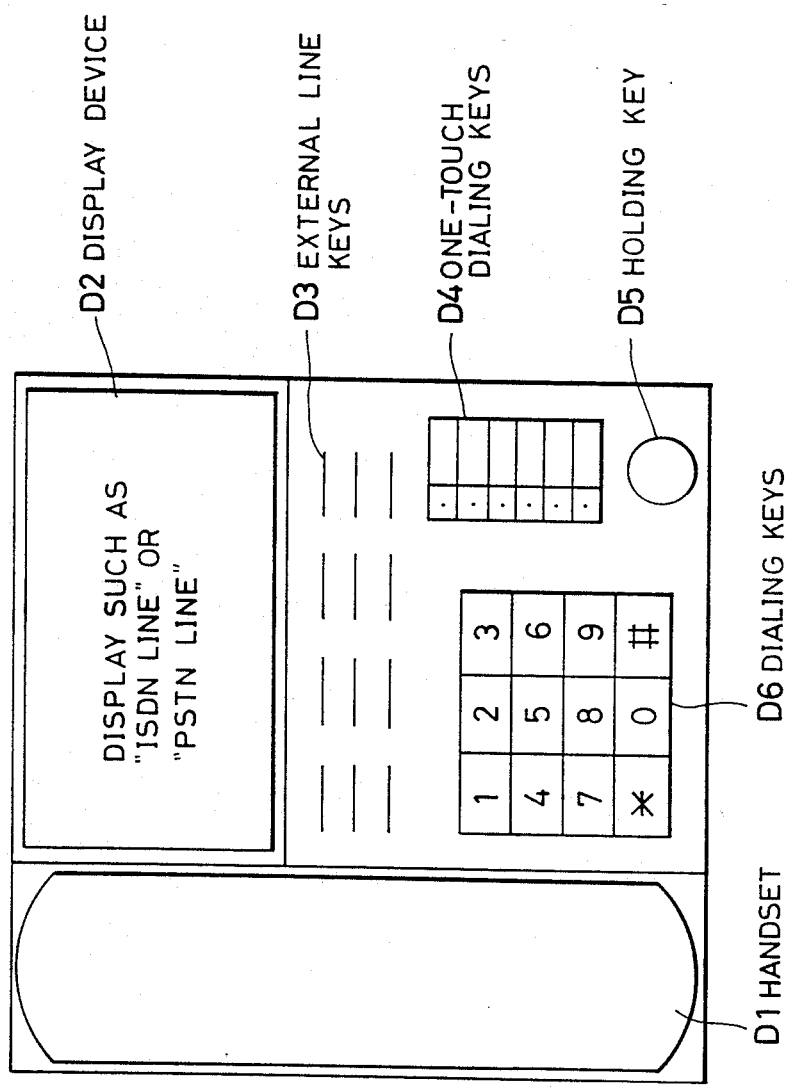
FIG. 2 is a view showing the external appearance of an extension telephone set of the embodiment.

Description of Extension Telephone Set (FIG. 2)

FIG. 2 shows the external appearance of each of the extension telephone sets C1 to C4 in the embodiment. As shown in the figure, each extension telephone set mainly comprises a handset D1; an LCD device D2 for displaying whether an external line acquired during a calling-out operation is one of the ISDN lines A1 and A2 or one of the subscriber's telephone lines A3 and A4; external line keys D3 on which external line numbers "1" to "4" are respectively assigned to the external lines A1 to A4 accommodated in the main equipment B1; one-touch dialing keys D4 including an abbreviation key and keys for various functions; a holding key D5; and dialing keys D6.

Figure 3:
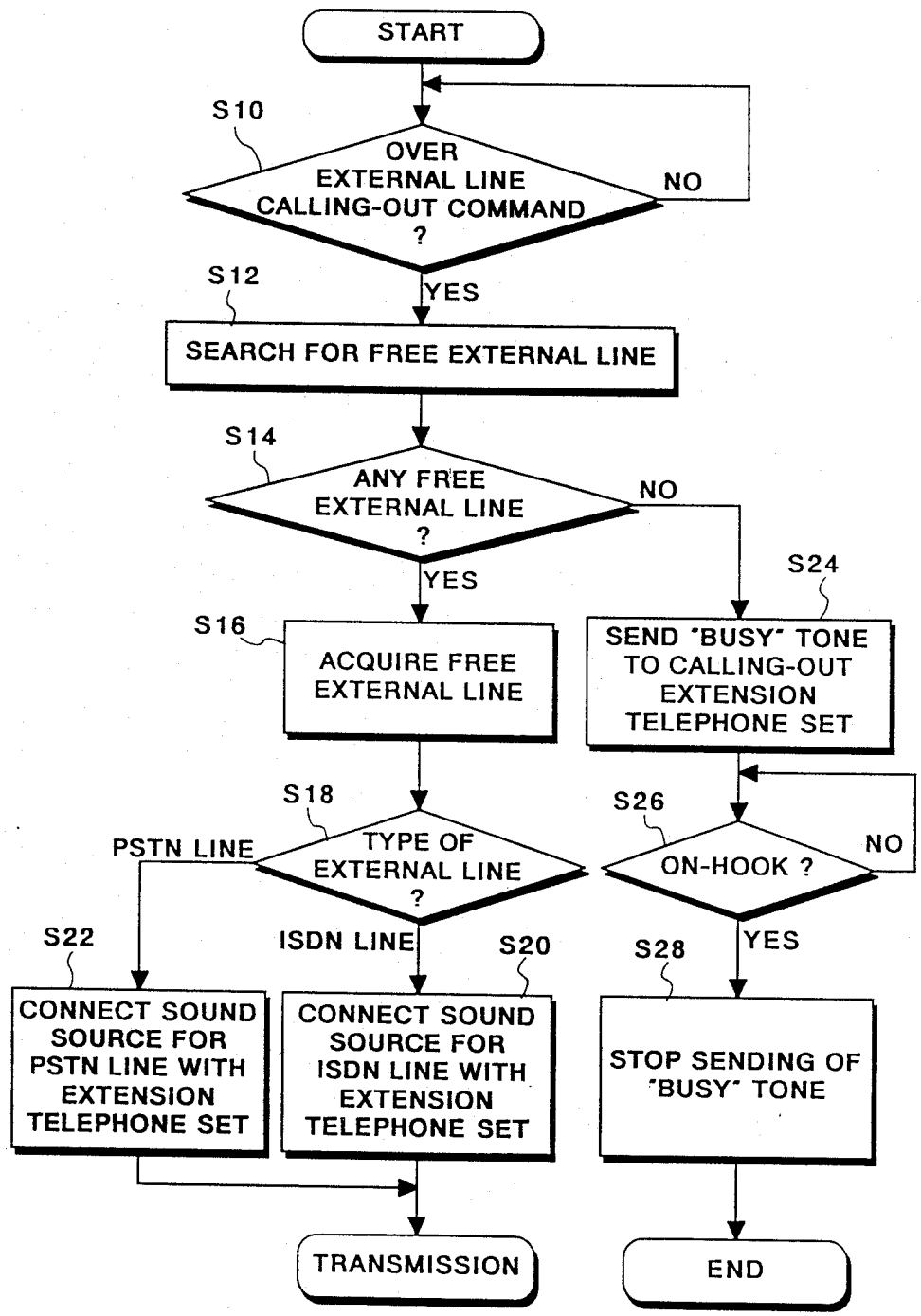
FIG. 3 is a flowchart showing the procedure for executing various steps in the embodiment.

Description of Control Procedure (FIG. 3)

Next, the procedure for calling out from one of the extension telephone sets C1 to C4 will be described below with reference to the flowchart shown in FIG. 3.

It is assumed that, in the following procedure, various system constants, such as the numbers "1" and "2" assigned to the ISDN lines, the numbers "3" and "4" assigned to the PSTN lines, and the number (two, in the illustrated case) of the sound sources, are already set using a console, not shown, or a specific extension telephone set.

First, in Step S10, the system stands by until any of the extension telephone sets C1 to C4 gives an over external line call-originating command. When the user starts to call out over an external line by using one of the external line keys D3 of, e.g., the extension telephone set C1, the control section in the exchange-control B8 receives, from the extension telephone set C1 via the associated extension trunk circuit B10, an over external line call-originating command corresponding to the used key (the external line to be acquired cannot be designated through the external line keys D3; instead, a free line, which may be among a plurality of free lines, is acquired).

Subsequently, in Step S12, the control section which has received the over external line call-originating command, searches for a free external line from among the external lines A1 to A4 (the lines A1 and A2, which are ISDN lines, themselves consist of two lines each). The result of this search is determined in Step S14. If there is no free external line, Step S24 is executed, in which a process, described later, is performed to cope with the busy condition. If there is a free external line, the external line is acquired in Step S16, and the type of the acquired external line is determined in Step S18. If this external line is determined to be an ISDN line, Step S20 is executed, in which a command is given whereby the exchange circuit in the exchange control B8 connects the first sound source B2 with the extension trunk circuit B10. On the other hand, if the acquired external line is determined to be a PSTN line, Step S22 is executed, in which a different command is given whereby the exchange circuit connects the second sound source B3 with the extension trunk circuit B10. The completion of S20 or S22 is followed by the termination of the procedure.

If it is determined in Step S14 that there is no free external line, Step S24 is executed, in which a "busy" tone is sent to the extension telephone set C1 commanding a call to be originated. Subsequently, when the on-hook state of the extension telephone set C1 is detected in Step S26, the sending of the busy tone is stopped in S28, thereby terminating the procedure.

In this embodiment, if the acquired external line is one of the ISDN lines A1 and A2, the first sound source B2 is connected, whereas if that line is one of the PSTN lines A3 and A4, the second sound source B3 is connected. In this way, different dial tones are sent to the pertinent extension telephone set among the sets C1 to C4, thereby enabling the caller to be informed of, from the dial tone generated, whether the acquired line is one of the ISDN lines A1 and A2 or one of the PSTN lines A3 and A4.

In this embodiment, the type of the acquired external line, i.e., whether it is an ISDN line A1 or A2, or a PSTN line A3 or A4, is posted by sending different dial tones from the first and second sound sources within the main equipment B1. Alternatively, however, a single sound source may be employed, with the same effect being achieved. In this case, the following arrangement may be adopted. If a dial tone is transmitted from, for instance, one of the subscriber's lines A3 and A4, the acquired external line A3 or A4 is connected to the extension line which is in turn connected to the pertinent extension telephone set among the sets C1 to C4, so that the dial tone from the line A3 or A4 is sent to inform the user of the acquisition of the PSTN line A3 or A4. If one of the ISDN lines A1 and A2 is acquired, a sound source, which is the sole sound source provided in the system, is caused to generate a tone for posting this acquisition.

In the above-described arrangement, the dialing tone itself may not be sent from the acquired external line to the pertinent extension telephone set. Instead, a single sound source for generating tones may be employed in such a manner that the frequency of the generated tone differs in accordance with the type of the acquired external line, thereby enabling the user to be informed of whether an ISDN line or a PSTN line has been acquired.

Further, in this embodiment, although a dial tone is employed to inform the user of the acquisition of either one of the ISDN lines A1 and A2 or one of the PSTN lines A3 and A4, the user may be alternatively informed of the acquisition by causing the display device D2, provided in each of the extension telephone sets C1 to C4, as shown in FIG. 2, to display the information on whether the acquired line is an ISDN line A1 or A2, or a PSTN line A3 or A4.

In the case where the display device D2 is employed, the main equipment B1 may have a construction achievable by removing the first and second sound sources B2 and B3 from the construction shown in FIG. 1. In the procedure, the process in which a tone is sent from the main equipment B1 to the pertinent extension telephone set among the sets C1 to C4 (in Step S20 or S22) is substituted by a process in which a command, described below, is sent from the main equipment B1 to the pertinent extension telephone set. A four-wire cable is used as the cable that connects the main equipment B1 with each of the extension telephone sets C1 to C4, so that two of the wires are used to transmit speech, whereas others are used to send and receive commands. One of the commands which may be present between the main equipment B1 and each of the extension telephone sets C1 to C4 is an "over external line call-originating command" sent from one of the extension telephone sets C1 to C4. In response to this command, the main equipment B1 gives one of three kinds of commands (i.e., makes one of three kinds of responses) which are each indicative of the condition where an ISDN line has been acquired, a PSTN line has been acquired, or the external lines are busy.

When the pertinent extension telephone set among the sets C1 to C4 has received the one of the three kinds of commands (responses), the information indicated by the command is displayed on the display device D2, thereby informing the user of the condition.

In the above described arrangement, the extension telephone set among the sets C1 to C4 which has received the command from the main equipment B1 acts to display, on the display device D2, the information indicated by the command, thereby informing the user of the condition where an ISDN line has been acquired, a PSTN line has been acquired, or the external lines are busy. However, this arrangement may be substituted by the following. Instead of the pertinent extension telephone set among the sets C1 to C4 acting to display the information on the display device D2, the extension telephone set which have received one of the three kinds of the commands acts to cause one of three kinds of tones to be generated in the telephone set in accordance with the received command, so as to post the condition where an ISDN line has been acquired, a PSTN line has been acquired, or the external lines are busy.

With the above-described embodiment of the present invention, during a calling-out operation, the user is informed of whether the external line acquired is an ISDN line or a PSTN line. This allows the dial inputting for the call origination to be performed in different manners in accordance with the type of the acquired external line. During a calling-out over a PSTN line, a simple dialing of the user, which may be the same as that in normal cases, suffices for the calling-out operation of the system. On the other hand, during a calling-out over an ISDN line, the whole dial number is transmitted as a packet of data.

Specifically, in the case of a calling-out over an ISDN line, the completion of the dialing must be posted. Therefore, when the inputting of the call-originating dial number has been completed, a key corresponding to "#" or "✶", or a "calling out" key provided on each extension telephone set is depressed, so as to post the completion of the inputting of the dial number. As a result, a calling-out operation over a PSTN line and that over an ISDN line are rendered different, thereby avoiding the risk of any errors in control.

Effect of the Invention

As has been described above, by virtue of the arrangement in which, during a calling-out from an extension telephone set over an external line, the user is informed of the type of the acquired external line, thereby enabling the user to positively utilize various services available in the ISDN if such is desired.

Furthermore, during a calling-out from an extension telephone set over an external line, the user is allowed to perform different calling-out operations on the basis of the type of the acquired external line, thereby enabling a positive control of calling-out operations.

Although the present invention has been described in its preferred form, it is to be understood that the invention is not limited to the foregoing embodiment, and that various modifications may be made in the invention without departing from its scope as set out in the appended claims.

What is claimed is:

1. A key telephone system in which both a line in a digital network and a public switched analog telephone network are accommodated as external lines in the main equipment of the system, and in which extension telephone sets connected to at least two extension lines are each able to call out another terminal over an external line which may be either the digital line or the analog line, comprising:

a determining means for determining which type is the external line acquired in response to a calling-out command from one of said extension telephone sets, whether it is the digital line or the analog line; and an informing means for informing, on the basis of the result of the determination of said determining means, said extension telephone set of the type of the acquired external line.

2. A key telephone system according to claim 1, wherein said determining means includes an external line acquiring means for acquiring a free external line in response to the calling out command from said extension telephone set, said determining means determining the type of the external line acquired by said external line acquiring means.

3. A key telephone system according to claim 2, wherein said informing means includes at least one sound source incorporated in said main equipment that is capable of generating audible sound, said informing means sending different kinds of audible sound to said extension telephone set in accordance with the type of the acquired external line.

4. A key telephone system according to claim 3, wherein said sound source generates a dial tone as said audible sound.

5. A key telephone system according to claim 1, wherein each of said extension telephone sets has a display means for displaying information on the basis of display information supplied from said main equipment, said informing means sending, to said extension telephone set, different display information in accordance with the type of the acquired external line.

6. A key telephone system according to claim 5, wherein said display means includes an LCD device, said device being capable of displaying thereon information on the basis of the display information supplied from said main equipment.

7. A key telephone system according to claim 1, wherein said extension telephone sets each allow different dial call-originating operations in accordance with the type of the acquired external line which has been posted by said informing means.

* * * * *

UNITED STATES PATENT AND TRADEMARK OFFICE
CERTIFICATE OF CORRECTION

PATENT NO. : 4,958,369
DATED : September 18, 1990
INVENTOR(S) : SHINJI TSUCHIDA

It is certified that error appears in the above-identified patent and that said Letters Patent is hereby corrected as shown below:

COLUMN 1

Line 68, "Q" should be deleted.

COLUMN 2

Line 67, "off hook" should read --off-hook--.

COLUMN 6

Line 30, "calling out" should read --calling-out--.

Signed and Sealed this

Thirtieth Day of June, 1992

Attest:

DOUGLAS B. COMER

Attesting Officer    Acting Commissioner of Patents and Trademarks